United States Patent [19]

van den Burg

[11] Patent Number: 4,665,670
[45] Date of Patent: May 19, 1987

[54] TWO-PIECE LOCK FOR SECURING POLYMERIC SHEETING OVER GREENHOUSES

[76] Inventor: Wouter M. van den Burg, 565 Colina Ter., Monterey Park, Calif. 91754

[21] Appl. No.: 756,594

[22] Filed: Jul. 19, 1985

[51] Int. Cl.$^4$ ............................................. E04B 1/00
[52] U.S. Cl. ........................................ 52/222; 47/17;
  52/202; 160/354; 160/380
[58] Field of Search .................... 52/63, 222; 160/382,
  160/391, 394, 395, 397; 47/17

[56] References Cited

U.S. PATENT DOCUMENTS

| 875,552 | 12/1907 | McGee | 160/394 |
|---|---|---|---|
| 1,741,958 | 12/1929 | Shogren | 160/397 |
| 3,909,994 | 10/1975 | Richter | 52/63 |
| 4,231,141 | 11/1980 | Derrick | 160/395 |
| 4,453,585 | 6/1984 | Ruggeberg et al. | 52/202 |
| 4,566,236 | 1/1986 | Pound | 52/202 |

FOREIGN PATENT DOCUMENTS 1145921  5/1983  Canada .................... 52/222

OTHER PUBLICATIONS

T-lok advertisement; Mar. 2, 1984; 104½ Charter. P.O. Box 358, Redwood City, CA.

Primary Examiner—J. Karl Bell
Attorney, Agent, or Firm—Edgar W. Averill, Jr.

[57] ABSTRACT

An improved two-piece lock for securing polymeric sheeting for use in covering greenhouses. The lock has an elongated lower member affixed to the frame of the greenhouse and one or more layers of polymeric sheeting are held in the lock between the lower member and an upper member. The upper member has two downwardly extending bars one of which fits into a channel of the lower member and the other of which abuts a concave contact bar of the lower member which faces the channel.

11 Claims, 7 Drawing Figures

TWO-PIECE LOCK FOR SECURING POLYMERIC SHEETING OVER GREENHOUSES

BACKGROUND OF THE INVENTION

The field of the invention is clamps and the invention relates more particularly to clamps of the type useful for holding polymeric sheeting or other thin, flexible material.

Most modern greenhouses utilize two polymeric sheets which are adjacent at their edges and which are inflated therebetween to provide an insulative, and yet highly translucent, roofing. This permits the sunlight to pass through the roofing but still provides a highly insulative covering to exclude rain, insects and other elements which impair the optimum growing climate created within the greenhouse. Of course, it is important that the clamp or lock not form a line of stress for the sheeting which undergoes a certain amount of movement in the wind. It is also useful that the clamp provide shade for the polymeric sheeting at the line along which it is clamped so that the damaging ultraviolet rays will not weaken the sheeting at this critical point.

Extruded aluminum locks have found widespread use because of their ability to withstand outdoor weathering together with relatively low fabrication costs. The clamps typically have a lower member which is affixed to the frame of the greenhouse, and the sheeting is placed over the lower member. An upper member is then pressed into the lower member thereby holding the sheeting in place. One commonly used type of lock utilizes a separate metal clip to hold the upper member over the lower member. A preferred type of clamp has an upwardly-facing channel along one edge of the lower member and an upwardly extending contact bar along the other edge of the lower member. The upper member has a first downwardly facing contact bar which fits into the channel of the lower member and a second downwardly facing contact bar which abuts the outer surface of the contact bar on the lower clamp member. Although this clamp or lock is generally satisfactory, it has two significant drawbacks. First, the upper and lower members must both be made with a very close dimensional tolerance so that the upper member will stay securely on the lower member. Secondly, the upper member must be placed in the correct orientation in the lower member. If inserted incorrectly, it will fit into the lower member, but it will not hold the sheeting securely in place.

SUMMARY OF THE INVENTION

It is an object of the present invention to provide an improved two-piece lock for securing polymeric sheeting over greenhouses, which lock does not require close dimensional tolerance and which lock permits the upper member to be inserted in either of the two possible orientations.

The present invention is for an improved two-piece lock for securing polymeric sheeting for use in covering greenhouses and the like of the type which has a lower member which is affixed to a greenhouse cross-member and which is overlayed with one or more layers of polymeric sheeting, and which lower member mates with an upper member which is placed over the polymeric sheeting and the lower member. The improved clamp of the present invention comprises an elongated lower member which has a base which has a first edge and a second edge and has a channel along the first edge thereof. The shape of a cross-section of the channel is that of an upwardly-facing "C." An elongated, upwardly extending contact bar is affixed to the base along the second edge thereof, and the bar has a concave contact surface which faces the channel. An elongated upper member is placed over the polymeric sheeting and the lower member and has a top support surface having a first edge and a second edge. A first downwardly extending contact bar is affixed to the upper member parallel to and spaced near the first edge, the first contact bar having an outwardly extending contact ridge which fits into the channel of the elongated lower member. A second downwardly extending contact bar is affixed to the upper member parallel to and spaced near the second edge. The second contact bar also has an outwardly extending contact ridge which abuts the concave contact surface when the first contact bar is positioned within the channel. Preferably, the upper member has at least one and preferably two extensions along the top support surface which provide protection against sunlight. It is also preferable that the upper member be made symmetrical about its longitudinal, vertical axis so that it may be inserted in either direction into the lower member.

DESCRIPTION OF THE PREFERRED EMBODIMENTS

Figure 1:
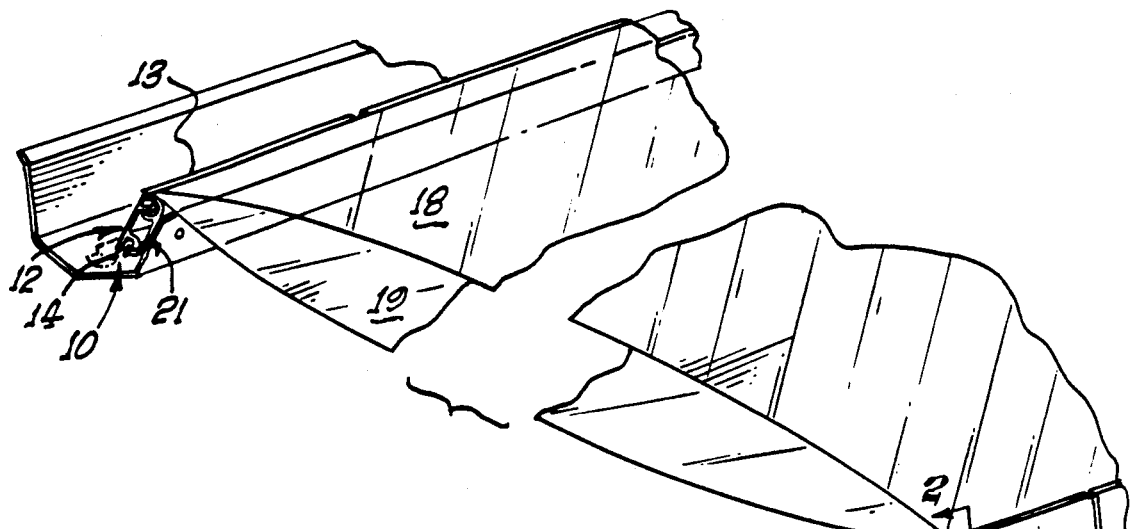
FIG. 1 is a perspective view of two lock assemblies of the present invention holding two polymeric sheets therein.

Two two-piece locks of the present invention are shown in perspective view in FIG. 1 and indicated by reference characters 10 and 11. Lock 10 has an upper member 12 which is shown in cross-sectional enlarged view in FIG. 2. Upper member 12 has a first edge 13 and a second edge 14 which extend outwardly from a first downwardly extending contact bar 15 and a second downwardly extending contact bar 16. This provides sunlight protection for the stressed portion 17 of the upper polymeric sheet 18 and the lower polymeric sheet 19. The stressed portion is shown best in FIG. 3.

The clamping action takes place within channel 20 of the lower member 21. Channel 20 is positioned along the first edge 22 of base 23. A contact bar 24 is formed along the second edge 25 of base 23. The first downwardly extending contact bar 15 has an upper arm 26 which is about normal to the elongated upper member 12 and a lower arm 27 which is at about a forty-five degree angle with respect to the upper arm and extending outwardly with respect to the upper member. Lower arm 27 has an outwardly extending contact ridge 28 which contacts the outer surface of polymeric sheet 18 and squeezes sheets 18 and 19 against the inner surface of channel 20. It can be seen in either FIG. 2 or 3 that an outward pull on the polymeric sheeting tends to move the lower arm upwardly and increase the contact pressure against the inner surface of channel 20. When this pull is relaxed, the clamping force is also relaxed so that the clamping action is maintained at that level which is just sufficient to hold the sheeting and yet not damage it. The second downwardly extending contact bar 16 also has an upper arm 51 which is at about a right angle with respect to the upper member 12 and a lower arm 29 which is at about a forty-five degree angle with respect to the upper arm. The lower arm 29 has an outwardly extending contact ridge 30 which holds the polymeric sheeting against the concave contact surface 31 of contact bar 24. It can also be seen that second edge 14 extends outwardly from the contact bar 16 which permits a ready surface for removal of upper member 12 as shown in phantom view in FIG. 2.

Another important aspect of the present invention is the ability of the upper member to be made symmetrical so that it may be inserted in either direction. It can be seen that upper member 12 is symmetrical about plane A which is the vertical bisection plane of the upper member.

Figure 4:
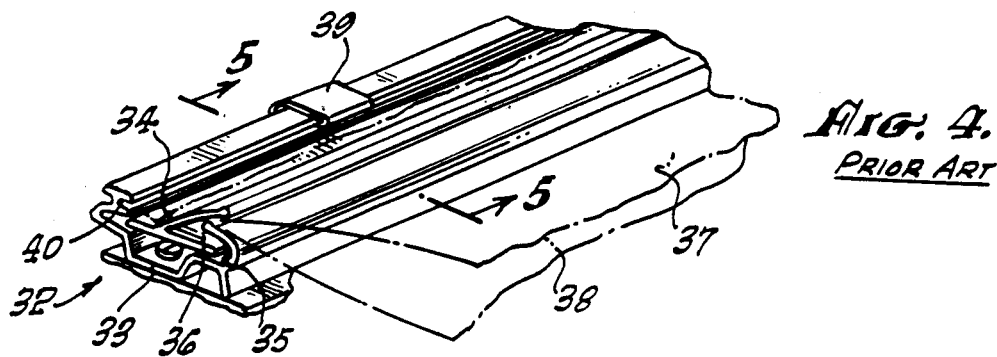
FIG. 4. is a perspective view of a prior art lock.
Figure 5:
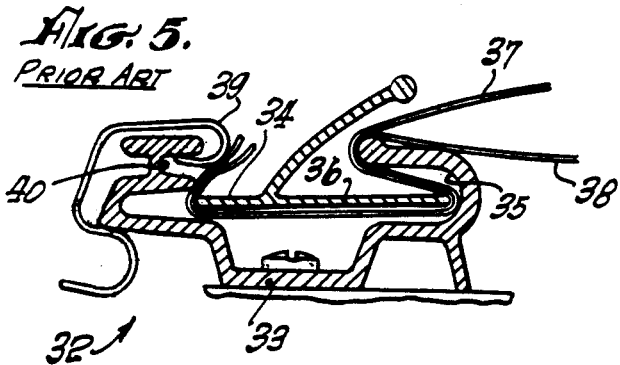
FIG. 5 is a cross-sectional view taken along line 5—5 of FIG. 4.

One form of prior art lock is shown in FIGS. 4 and 5 and indicated by reference character 32. Lock 32 has a lower member 33 and an upper member 34. Lower member 33 has an inwardly facing channel 35 which cooperates with base 36 of upper member 34 to hold polymeric sheets 37 and 38 in the lock. In order to prevent the upper member 34 from being separated from lower member 33, a plurality of clips 39 are inserted into groove 40 of lower member 33. A major disadvantage of this construction is the necessity for using clips 39 which, if not installed, can result in a portion of the sheeting becoming unclamped which can result in possible damage to the sheeting as well as the contents of the greenhouse.

Figure 6:
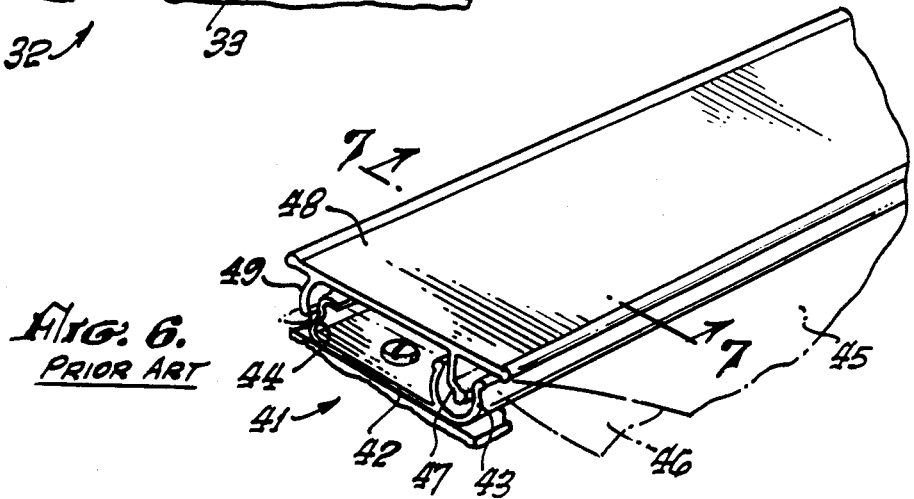
FIG. 6 is a perspective view of a different prior art lock.
Figure 7:
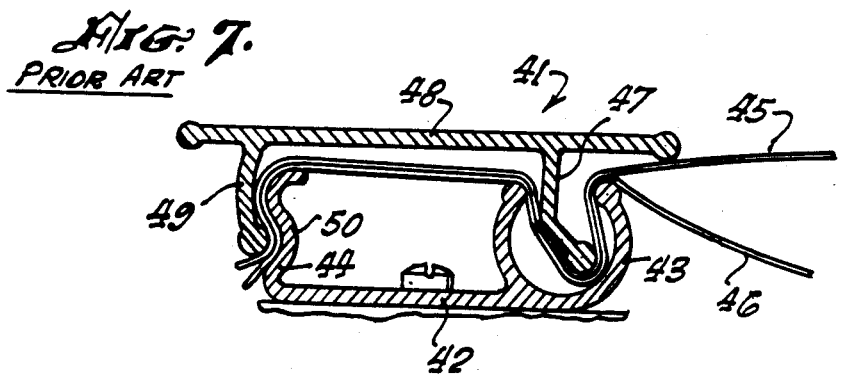
FIG. 7 is a cross-sectional view taken along line 7—7 of FIG. 6.

A second prior art lock is shown in FIGS. 6 and 7 and indicated by reference character 41. Lock 41 has a lower member 42 which has an upwardly-facing channel 43 and an upwardly extending contact bar 44. The clamping action of the prior art clamp is shown best in FIG. 7 where polymeric sheets 45 and 46 are held in channel 43 by contact bar 47 and upper member 48. A second contact bar 49 abuts the outer surface of bar 50 holding the clamp in place. Unfortunately, this design requires close tolerances, and it has been found that if the two members are not the proper size, that the clamp will not perform its function. It can be seen, for instance, in FIG. 7 that as the polymeric sheets 45 and 46 pull contact bar 47 upwardly that this can tend to urge or move contact bar 49 away from bar 50 resulting in a failure of the clamp. This is particularly true if only one polymeric sheet is being clamped.

Figure 2:
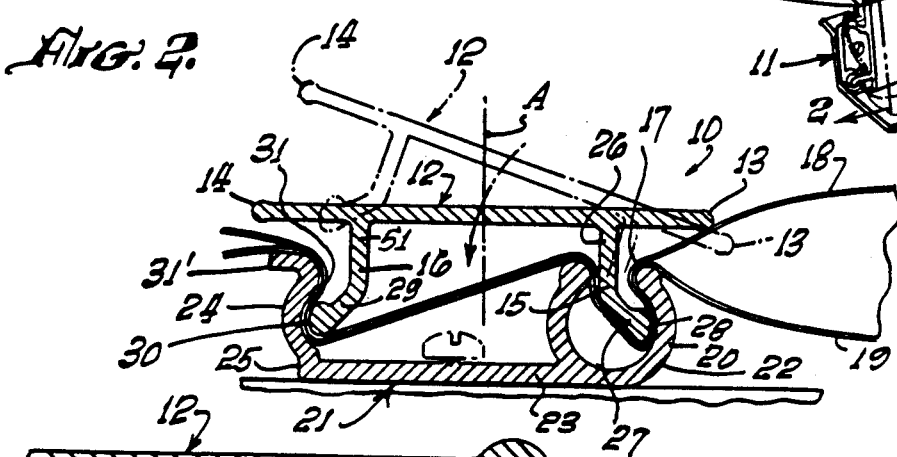
FIG. 2 is an enlarged cross-sectional view taken along line 2—2 of FIG. 1.
Figure 3:
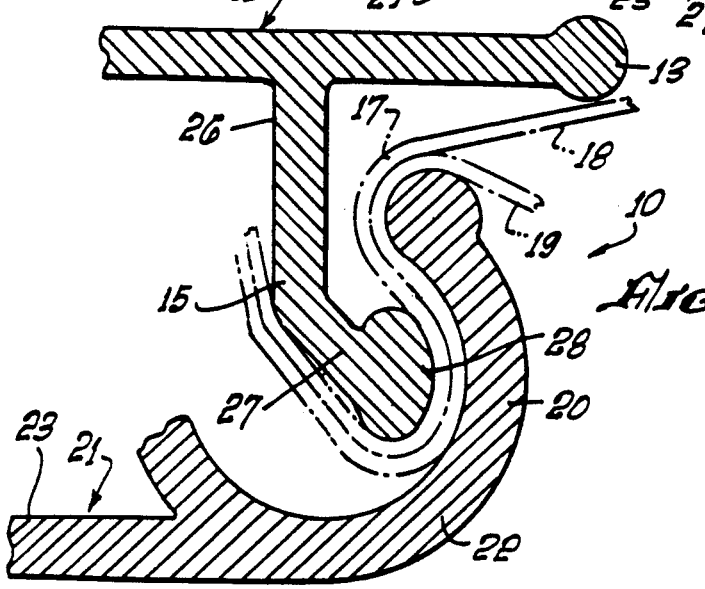
FIG. 3 is an enlarged cross-sectional view showing a portion of the channel of the lower member and the first downwardly extending contact bar of the upper member of the lock of FIG. 1.

As shown in FIG. 2 of the drawings, the upward movement of applicant's clamp, rather than reducing the pressure of contact ridge 30 against contact bar 24, instead increases the pressure helping to prevent an undesired, unclamping movement of the upper member 12. Because of this, the tolerances of the upper and lower members of the clamp of the present invention can be much greater than that of the prior art clamp of FIGS. 6 and 7.

In order to provide a smooth insertion of the upper member into the lower member, it is preferable that the upper portion of contact bar 24 be curved outwardly as shown at reference character 31 prime. The clamp is assembled by first placing the polymeric sheet or sheets over the lower member and inserting the first downwardly extending contact bar 15 into channel 20. Next, the second edge 14 of the upper member is pushed downwardly and the contact ridge 30 is moved inwardly along the upper surface of the outwardly extending portion 31 prime until it slips downwardly into the concave contact surface 31.

Although the downwardly extending contact bars of the upper member have been shown as having two straight sections, the upper one being normal to the surface of the upper member and the lower part being at a forty-five degree angle therefrom, these lower members could instead be curved rather than at an angle. Although the outwardly extending edges of the upper member serve both to shade the polymeric sheeting and to provide an easy means of removing the upper member, the clamp will also operate satisfactorily without these outwardly extending portions.

The ability of the clamp to function over a relatively wide dimensional tolerance is important since the clamp must function both in cold weather and hot weather which changes the relative size of the upper and lower members. The upper member of the present invention is believed capable of functioning over a wide dimensional tolerance because it is essentially a free-floating clamping action. The upper member may be relatively loose in the lower member, but any pull on the polymeric sheeting tends to immediately cause it to tighten.

While the device of the present invention is shown in the drawings as holding a pair of polymeric sheets, it, of course, can function satisfactorily with one sheet or more than two sheets as long as the thickness of the sheeting is such that the contact bar will fit easily into channel 20. Typically, the upper members are provided in shorter lengths for ease of insertion and the lower members are provided in longer lengths for ease of attachment to the greenhouse.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved two-piece lock for securing polymeric sheeting for use in covering greenhouses and the like of the type which has a lower part which is affixed to a greenhouse cross-member and which is overlayed with one or more layers of polymeric sheeting and which lower member mates with an upper member which is placed over the polymeric sheeting and the lower member, said improvement comprising:

an elongated lower member which has a base which has a first edge and a second edge and has a channel along the first edge thereof, the shape of a cross-section of said channel comprising about the shape of an upwardly-facing "C";

an elongated, upwardly extending contact bar affixed to said base along the second edge thereof, said bar having a concave contact surface facing said channel;

at least one polymeric sheet overlying said elongated lower member and extending past the first and second edges thereof;

an elongated upper member having a top support surface having a first edge and a second edge;

a first downwardly extending contact bar affixed to said upper member parallel to and spaced near said first edge, said first contact bar having an outwardly extending contact ridge which fits into the channel of the elongated lower member said contact ridge contacting the upper surface of said polymeric sheet and holding said sheet against the inner surface of the outer edge of said upwardly facing "C" shaped channel; and a second downwardly extending contact bar affixed to said upper member parallel to and spaced near said second edge, said second contact bar having an outwardly extending contact ridge which abuts said polymeric sheet and holds said sheet against the concave contact surface.

2. The improved lock of claim 1 wherein the upper member is symmetrical about a vertical bisecting plane.

3. The improved lock of claim 1 wherein the first edge of the upper member extends vertically beyond the outermost edge of the "C" channel.

4. The improved lock of claim 1 wherein the second edge of the upper member extends vertically beyond the outermost edge of the contact bar.

5. The improved lock of claim 1 wherein the first edge of the upper member extends vertically beyond the outermost edge of the "C" channel and the second edge of the upper member extends vertically beyond the outermost edge of the contact bar.

6. An improved two-piece lock for securing polymeric sheeting for use in covering greenhouses and the like of the type which have a lower part which is affixed to a greenhouse cross-member and which is overlayed with one or more layers of polymeric sheeting and which lower member mates with an upper member which is placed over the polymeric sheeting and the lower member, said improvement comprising:

an extruded aluminum elongated lower member which has a base which has a first edge and a second edge and has a channel integrally formed along the first edge thereof, the shape of a cross-section of said channel comprising about the shape of an upwardly facing "C";

an integral, elongated, upwardly extending contact bar affixed to said base along the second edge thereof, said bar having a concave contact surface facing said channel;

at least one polymeric sheet overlying said elongated lower member and extending past the first and second edges thereof;

an extruded aluminum elongated upper member having a top support surface having a first edge and a second edge;

a first downwardly extending contact bar integral with said upper member parallel to and spaced near but away from said first edge, said first contact bar having an outwardly extending contact ridge which fits into the channel of the elongated lower member said contact ridge contacting the upper surface of said polymeric sheet and holding said sheet against the inner surface of the outer edge of said upwardly facing "C" shaped channel; and a second downwardly extending contact bar integral with said upper member parallel to and spaced near but away from said second edge, said second contact bar having an outwardly extending contact ridge which abuts said polymeric sheet and holds said sheet against the concave contact surface.

7. The improved lock of claim 6 wherein said first downwardly extending contact bar has a vertical portion which is normal to the top support surface of the upper member and having a second portion which is at about a forty-five degree angle with respect to the vertical portion.

8. The improved lock of claim 6 wherein said second downwardly extending contact bar has a vertical portion which is normal to the top support surface of the upper member and having a second portion which is at about a forty-five degree angle with respect to the vertical portion.

9. The improved lock of claim 6 wherein said first and second downwardly extending contact bars each have a vertical portion which is normal to the top support surface of the upper member and having a second portion which is at about a forty-five degree angle with respect to the vertical portion.

10. The improved lock of claim 9 wherein said upper member is symmetrical about its vertical longitudinal axis.

11. The improved lock of claim 6 wherein said upwardly extending contact bar has an upper terminus which is curved and facing outwardly from said lower member.

* * * * *